United States Patent Office.

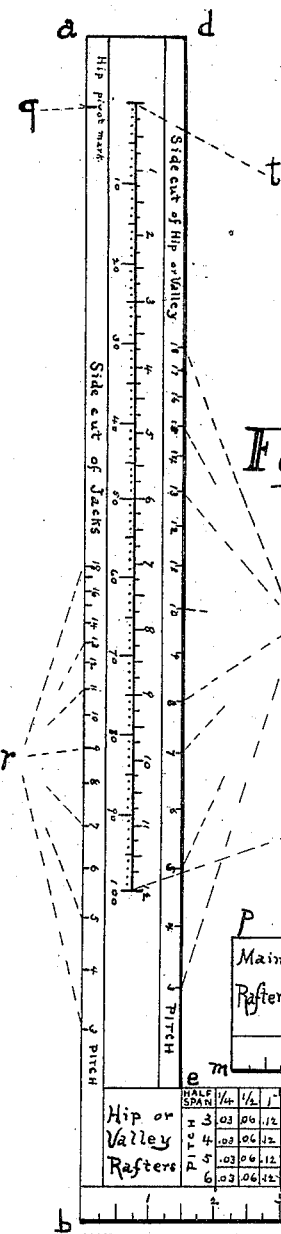

HENRY SMITH AND GEORGE N. LEMMON, OF ENGLEWOOD, NEW JERSEY.

CARPENTER'S SQUARE.

SPECIFICATION forming part of Letters Patent No. 691,192, dated January 14, 1902.

Application filed February 20, 1901. Serial No. 48,038. (No model.)

*To all whom it may concern:*

Be it known that we, HENRY SMITH and GEORGE N. LEMMON, citizens of the United States, and residents of Englewood, in the county of Bergen and State of New Jersey, have invented a new and useful Improvement in Carpenters' Squares, of which the following is a full, clear, and exact description.

The invention is a new design for marking and numbering the tool known as a "carpenter's square," which consists, essentially, of two flat arms or tongues at right angles to each other and properly graduated.

By means of our invention the timbers or beams for the roof of a building can be more easily measured and marked to be sawed.

In the following description and claims the different timbers are designated as follows:

The "plate" consists of the horizontal timbers at the top of the vertical walls of the building. The timbers which rest on the plate and support the roof are "rafters." The "main" rafters extend to the peak of the roof, and their projections upon the plane of the plate are perpendicular to the plate. The length of such projection is called "half the span of the roof." A "hip-rafter" extends from the angle of the plate at a corner where the building forms a right angle to the peak of the roof, and its projection upon the plane of the plate bisects the said right angle. A similar rafter, where the building forms an angle of two hundred and seventy degrees, is called a "valley-rafter." The rafters which extend from the plate to a hip-rafter or from a valley-rafter to the peak of the roof and which are parallel to the main rafters are called "jack-rafters" or "jacks." In this specification and these claims the thickness of the board or beam at the peak of the roof is disregarded. Due allowance for it will be made by the carpenter in using the square.

The line on top of a jack where it is sawed to meet a hip or valley rafter is called the "side cut of the jack." The side cut of a hip or valley rafter is the edge on its upper face where it meets a vertical plane which is parallel with the plate. A "plumb cut" is one which is vertical and a "level cut" is one which is horizontal when the rafter is in position. The number of inches elevation which the roof has for each foot of span is called the "pitch of the roof."

The specific objects of our invention are to easily determine when the pitch of the roof is known—first, the cuts at the ends of a hip or valley rafter; second, the side cuts of the jacks; third, of the hip or valley rafters; and when the length of the span or half-span is also known, fourth, the length of the main rafters; fifth, the lengths of the hip or valley rafters; also when the pitch of the roof and the distance between the centers of the jacks are known, sixth, the difference in lengths of adjacent jacks.

Reference being had to the accompanying drawings, Figure 1 shows reduced one side of the square with one of the arms *bf* represented only partially. Fig. 2 shows reduced the other side of the square *gkm* corresponding to *abc*.

The edges *bc* continued and *km* completed are graduated in inches, as in the portions shown.

The mark $q$ is 16.97 inches, approximately, from $b$, and when the square is placed flat upon the side of a hip or valley rafter and the mark $q$ and the figure on the edge *bc* which corresponds in number with the pitch of the roof are at the same edge of the rafter then the edges *ab* and *bc* indicate, respectively, first, the angles for the level and plumb cuts of the said hip or valley rafter. The marks $r$ from the one numbered "3" to the one numbered "18" are, respectively, 2.92, 3.8, 4.62, 5.37, 6.05, 6.66, 7.2, 7.68, 8.11, 8.49, 8.82, 9.11, 9.37, 9.6, 9.8, and 9.98, inches, approximately, from $b$. When the square is flat on the top of a jack and the mark $r$ and the mark on *bc*, whose numbers correspond to the pitch of the roof are both placed at the same edge of the said jack, the edge *bc* indicates, second, the side cut of the jack. The arm *bd* is one and one-half inches wide, and therefore each inch-mark on *bc* continued to *ef* is one and a half inches nearer $e$ than the number of the said inch-mark indicates. The marks $s$ from the one numbered "3" to the one numbered "18" are, respectively, 1.47, 2.43, 3.35, 4.24, 5.09, 5.88, 6.63, 7.32, 7.97, 8.57, 9.13, 9.64, 10.11, 10.95, and 11.32 inches, approximately, from $e$. When the square is placed flat upon the top of a hip or valley rafter and the mark s and the inch-mark on ef (continued from bc) whose numbers correspond to the pitch of the roof are at the same edge of the said rafter, then the edge bc indicates, third, the angle for the side cut of the rafter.

We are aware that squares have been made graduated along two perpendicular edges in inches and that approximately similar angles are indicated by tables which specify certain inch-marks on each edge, and we do not claim such as our invention.

The table of figures u gives in feet and decimal-fractions thereof the length of the main rafters in any roof with a pitch of three, four, five, or six inches. Figures whose sum is equal to half the span of the roof are selected from those at the top of the table. The numbers which are in the horizontal line corresponding to the pitch of the roof and also in the same vertical column as the selected figures are then added together. Their sum is, fourth, the length of the required main rafter expressed in feet and decimal-fractions thereof. Thus if one-half the span of a roof which has a rise of five inches to the foot is eleven feet nine inches select in the vertical columns which are headed "10'", "1'", "7''", and "2'''", respectively, the figures "10.83," "1.08," ".63," ".18." Their sum "12.72" is the length in feet of the main rafter for that roof. On the part of the square kmpo which is not shown similar tables give similarly the lengths of rafters for roofs of other pitches.

We are aware that squares have been made which give the length per foot of span of different rafters and which utilize the inch-marks at one edge of the square as a part of the tables. Such we do not claim as our invention.

The tables v and v continued upon the unshown portion of the arm bcfe give similarly, fifth, the lengths of hip or valley rafters in feet and decimal-fractions thereof.

The tables of figures w give, sixth, the difference in length between adjacent jacks in roofs of various pitches, as indicated by figures at the sides of the tables, when the centers of the jacks are sixteen, eighteen, twenty, or twenty-four inches apart, as indicated by the figures at the top of the tables.

We are aware that squares have been made giving the difference in length between jacks under some conditions which utilize the inch-marks at the edge of the square as a part of the tables. Such we do not claim as our invention.

At a suitable part of the square the same edge or line tt is graduated in inches and fractions thereof and also into decimal-fractions of a foot, so that decimal-fractions of a foot can be quickly expressed in inches and fractions thereof.

Having described our invention, we claim as new and desire to secure by Letters Patent—

1. As a new article of manufacture, a carpenter's square comprising two arms of unequal length perpendicular one to another, the outside edge of the long arm being graduated in inches, and the outside edge of the short arm so graduated and numbered that when the two marks on the respective arms which correspond to the pitch of the roof are placed on the same edge of a jack-rafter, the long arm indicates the angle of the side cut of the rafter; and the inside edge of the short arm so graduated and numbered that when the two marks on the respective arms which correspond to the pitch of the roof are placed upon the same edge of a hip or valley rafter, the long arm indicates the angle for the side cut of the rafter; and the long arm having upon its face a table which gives, for roofs of various pitches the proportional length of a hip or valley rafter for various numbers of inches and feet of span.

2. As a new article of manufacture, a carpenter's square comprising two arms of unequal length perpendicular one to the other, the outside edge of the long arm being graduated in inches, and the outside edge of the short arm so graduated and numbered that when the two marks on the respective arms which correspond to the pitch of the roof are placed on the same edge of a jack-rafter, the long arm indicates the angle of the side cut of the rafter; and the inside edge of the short arm so graduated and numbered that when the two marks on the respective arms which correspond to the pitch of the roof are placed upon the same edge of a hip or valley rafter, the long arm indicates the angle for the side cut of the rafter; and means upon the square for ascertaining for roofs of various pitches the proportional length of a hip or valley rafter for various numbers of inches and feet of span, and means for ascertaining the difference in the length of two adjacent jack-rafters for various spacing in roofs of various pitches.

In witness whereof we have set out hands and affixed our seals in the presence of two witnesses.

HENRY SMITH. [L. S.]
    GEO. N. LEMMON. [L. S.]

Witnesses:
  JAS. D. LIVINGSTON,
  CHAS. D. STANTON.